No. 754,708. PATENTED MAR. 15, 1904.
J. ROSS & A. W. MACKENZIE.
BUSH OR LINER FOR CASKS AND MEANS FOR ATTACHING SAME.
APPLICATION FILED MAR. 19, 1903.

NO MODEL.

Witnesses:
Francis Wood Riddell
William Rankine Cockburn

Inventors:
James Ross
Alexander Woodcock Mackenzie

No. 754,708. Patented March 15, 1904.

UNITED STATES PATENT OFFICE.

JAMES ROSS AND ALEXANDER WOODCOCK MacKENZIE, OF EDINBURGH, SCOTLAND.

BUSH OR LINER FOR CASKS AND MEANS FOR ATTACHING SAME.

SPECIFICATION forming part of Letters Patent No. 754,708, dated March 15, 1904.

Application filed March 19, 1903. Serial No. 148,591. (No model.)

*To all whom it may concern:*

Be it known that we, JAMES ROSS and ALEXANDER WOODCOCK MACKENZIE, subjects of the King of Great Britain, residing at Edinburgh, Scotland, have invented certain new and useful Improvements in Bushes or Liners for Casks and in Means for Attaching the Same; and we do hereby declare the following to be a full, clear, and exact description of the invention, such as will enable others skilled in the art to which it appertains to make and use the same.

This invention relates to improvements in bushes or liners for casks and to means for inserting and securing the same in the bung-holes, whereby increased grip and holding power of such bushes or liners in the staves of the casks are attained as compared with the devices heretofore in use, and in order that the said invention may be fully understood we will proceed to describe the same with the aid of the accompanying sheet of drawings, in which—

Figure 1:
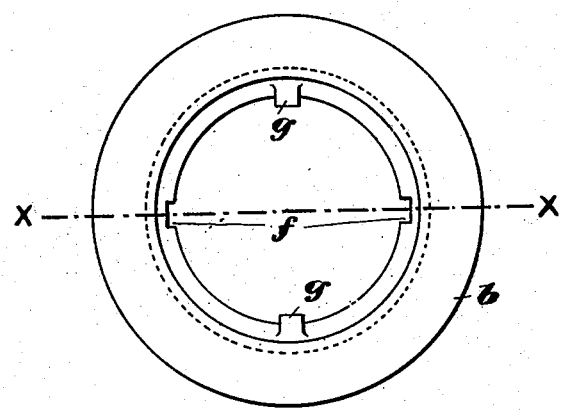
Figure 2:
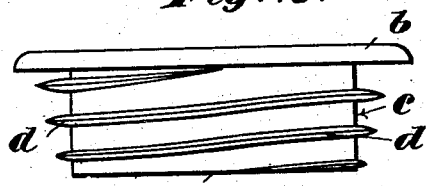
Figure 3:
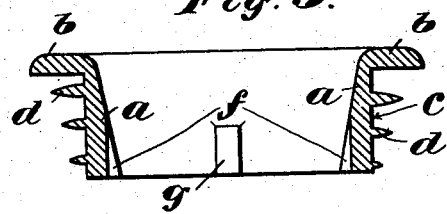

Figure 1 is a plan view of a bush or liner constructed in accordance with our invention; Fig. 2, a side view; Fig. 3, a section taken on line X X of Figs. 1 and 4, and Fig. 4 an under side view of same.

$a$ is the bush or liner, made of metal—such as malleable cast-iron, brass, or alloy, for example—of cylindrical shape externally, but conical internally, as shown, and having a flange or shoulder $b$ at its upper part. On the outer cylindrical surface $c$ is formed a tapered or spiral screw-thread $d$, which, starting from nothing at or near the lower edge $e$ of the bush, increases regularly in height as measured perpendicularly to the cylindrical surface $c$ as it winds round the bush and approaches the flange $b$, at which or shortly before reaching which the said screw-thread stops. The larger diameter of the conical opening through the bush is at the top thereof and the smaller at the bottom, as seen most clearly in Fig. 3, in order to adapt the hole to receive the usual tapered bung or shive.

At the lower internal part of the bush are formed, preferably diametrically opposite to each other, two vertical recesses or grooves $f$, adapted to receive the projections or teeth of a suitable key or tool by means of which the bush can be turned round and screwed into the bung-hole of the cask. This key or tool for screwing the bush into place may be made in any suitable way; but a convenient construction is to make it round and tapered, so as to fit the conical hole in the bush, and to provide its outer surface with projections or teeth to fit into the recesses or grooves $f$. It may be provided with a cross-bar or other means of turning it and applying power to it when screwing the bush into place. Instead of two grooves $f$ in the interior of the bush any other number may be employed, the key or tool being provided with a corresponding number of projections or teeth.

Figure 4:
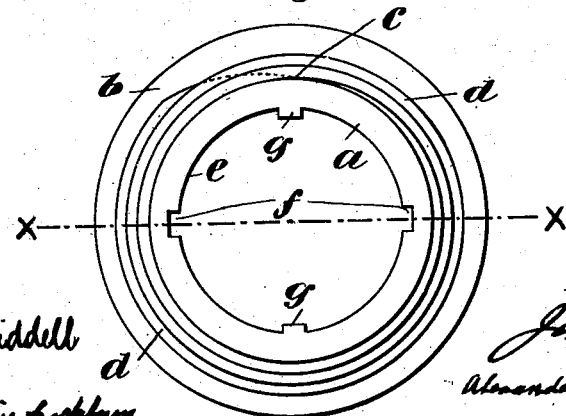

Instead of forming recesses or grooves $f$ in the interior of the bush projections may be formed therein, if preferred, as shown at $g$ in Figs. 1, 3, and 4, for example, and in that case the key or tool for screwing the bush into place is provided with notches corresponding to these projections instead of with projections or teeth corresponding with the recesses or grooves $f$.

When employing bushes constructed as above described, the bung-holes of the casks are preferably formed cylindrical to correspond as nearly as possible with the cylindrical surface $c$ of the bush.

It will be understood that when the bush is being inserted and screwed into the bung-hole the lower and least-projecting end of the tapered screw-thread $d$ first enters the wood of the stave, and as the screwing-in of the bush proceeds the increasing height of the screw-thread causes it to cut deeper and deeper into the wood until the shoulder $b$ is brought to bear firmly against the stave round the bung-hole.

In the screwed bushes heretofore in use the external surfaces have been tapered or conical, and the means of screwing the bushes into the bung-holes have been defective, the result of which has been that the bushes have been liable to become loose in the bung-holes, and thereby to permit leakage. These defects are entirely remedied by the bushes constructed as above described, because, on the one hand, the cylindrical shape of the bush holds more firmly than the tapered or conical shape, and, on the other hand, the means above described for screwing the bushes in place enable them to be screwed in quite firmly and securely.

We claim—

A bush or liner for bung-holes of casks having a cylindrical exterior and a conical interior and with the smaller diameter of the cone at the inner end of the bush, said bush being provided externally with a taper screw-thread which starts at nothing at the inner part of the bush and increases in height as it winds around said cylindrical surface and approaches the outer part of the bush, said bush being provided with means in its conical walls at the inner end thereof by which it can be screwed into place and having also a flange at its outer end, the opening in the bush extending clear through the same for the reception of the bung, said opening being of the same diameter as the smaller diameter of the cone, substantially as described.

In witness whereof we have hereunto set our hands in presence of two witnesses.

JAMES ROSS.
ALEXANDER WOODCOCK MacKENZIE.

Witnesses:
FRANCIS WOOD RIDDELL,
WILLIAM RANKINE COCKBURN.